US008353362B2

(12) United States Patent
Liebhard et al.

(10) Patent No.: US 8,353,362 B2
(45) Date of Patent: Jan. 15, 2013

(54) BATTERY PACK-OPERATED HAND-GUIDED POWER TOOL WITH THROTTLE LEVER

(75) Inventors: Gernot Liebhard, Waiblingen (DE); Ante Hamersmit, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 292 days.

(21) Appl. No.: 12/709,658

(22) Filed: Feb. 22, 2010

(65) Prior Publication Data

US 2010/0218966 A1 Sep. 2, 2010

(30) Foreign Application Priority Data

Feb. 27, 2009 (DE) .......................... 10 2009 012 181

(51) Int. Cl.
  *B25F 5/00* (2006.01)
(52) U.S. Cl. ............... 173/170; 173/217; 173/2
(58) Field of Classification Search .................. 173/170, 173/217, 2
  See application file for complete search history.

(56) References Cited

U.S. PATENT DOCUMENTS

| | | | | | |
|---|---|---|---|---|---|
| 5,002,135 | A | * | 3/1991 | Pellenc ........................... | 173/170 |
| 5,014,793 | A | * | 5/1991 | Germanton et al. ........... | 173/181 |
| 5,440,215 | A | * | 8/1995 | Gilmore ......................... | 318/432 |
| 6,536,536 | B1 | * | 3/2003 | Gass et al. ..................... | 173/2 |
| 6,741,051 | B2 | * | 5/2004 | Chu ............................... | 318/376 |
| 6,836,614 | B2 | * | 12/2004 | Gilmore ......................... | 388/811 |
| 7,331,406 | B2 | * | 2/2008 | Wottreng et al. .............. | 173/176 |
| 2003/0047331 | A1 | * | 3/2003 | Henderson et al. ............ | 173/4 |
| 2004/0159449 | A1 | * | 8/2004 | Leitenberger et al. ......... | 173/2 |
| 2005/0045353 | A1 | | 3/2005 | Kawai et al. | |
| 2007/0240892 | A1 | | 10/2007 | Brotto et al. | |
| 2008/0180059 | A1 | * | 7/2008 | Carrier et al. ................. | 320/112 |
| 2008/0235957 | A1 | | 10/2008 | Yoshida | |
| 2010/0071920 | A1 | * | 3/2010 | Lau et al. ....................... | 173/1 |

FOREIGN PATENT DOCUMENTS

DE  44 21 746 A1  1/1996
EP  1 733 612 A1  12/2006

* cited by examiner

*Primary Examiner* — Brian D Nash
(74) *Attorney, Agent, or Firm* — Gudrun E. Huckett

(57) ABSTRACT

A hand-held power tool has a device housing and at least one grip disposed on the device housing. An electric drive motor is arranged in the device housing for operating a working tool. A battery pack provides electric energy for operating the electric drive motor. An electronic control unit is connected to the electric drive motor and the battery pack. An operating element disposed on the grip controls the electric drive motor. An electric actuator is acted upon by the operating element and the output signal of the electric actuator is supplied to the electronic control unit. Electric energy is applied to the electric drive motor by the electronic control unit as a function of a position of the operating element, wherein in a first dead travel range of the operating element that adjoins an inoperative position of the operating element the supplied electric energy is zero.

11 Claims, 3 Drawing Sheets

BATTERY PACK-OPERATED HAND-GUIDED POWER TOOL WITH THROTTLE LEVER

BACKGROUND OF THE INVENTION

The invention relates to a hand-held power tool, in particular a portable, hand-held power tool such as a hedge trimmer, a motor chain saw, a brush or grass trimmer or the like. The power tool comprises at least one grip that is secured on the device housing, an electric drive motor arranged in the device housing, and an output for a working tool as well as a battery pack for operating the power tool. An operating element is provided on the grip for controlling the drive motor wherein the operating element acts on an electric actuator.

Portable hand-guided power tools with a battery pack as an energy source are known. For example, U.S. 2007/0240892 A1 discloses a portable hand-guided power tool in various configurations such as a motor chain saw, a hedge trimmer, brush or grass cutter, and the like. In the device housing an electric drive motor with a correlated output for a working tool is provided wherein the device housing comprises a battery pack that is connected by an appropriate electric control unit to the drive motor. By means of a first rear grip provided with an operating element the power tool is guided and the drive motor controlled, while a second front grip is gripped by the other hand of the operator in order to hold the power tool.

The embodiment of such a power tool with a battery pack-operated electric motor constitutes a special problem because, on the one hand, a satisfactory drive power must be made available and, on the other hand, a satisfactory operating time is required. The electric power that is to be made available requires appropriate battery packs of battery cells of a suitable chemical build.

The operating time of such devices depends primarily on how efficient the energy that is stored within the battery pack can be utilized when power output is demanded.

SUMMARY OF THE INVENTION

It is an object of the present invention to further develop a battery pack-operated hand-guided power tool such that the efficiency of utilization of a battery pack charge is improved.

In accordance with the present invention this is achieved, in that the output signal of the electric actuator is supplied to an electronic control unit to which the battery pack and the drive motor are connected and in that the electric energy that is supplied to the drive motor is supplied by the electronic control unit as a function of a position of the operating element, wherein in a first "dead" travel range of the operating element that adjoins an inoperative position of the operating element the supplied electric energy is "zero".

The throttle lever (operating element) of the power tool is connected to an electric actuator whose position-dependent output signal is supplied to the electronic control unit. In this way, the electronic control unit receives a position signal of the travel position of the throttle lever and supplies as a function of the travel position of the throttle lever the required energy to the drive motor. According to the present invention, it is provided to supply in a first travel range of the operating element, embodied as a throttle lever, which first travel range adjoins the inoperative position (rest position) of the operating element, the energy to be supplied as "zero", i.e. no electric energy is being supplied to the drive motor.

In this way it is achieved that the operator must suppress the throttle lever to a significant extent in order to begin operation of the drive motor. The advantage resides in that the loss-intensive start-up movement of the drive motor is passed through quickly because the motor is supplied with a correspondingly strong voltage signal already at the beginning. The operating phase of starting up the motor can therefore be kept short so that in the start-up phase of the motor the occurring electric losses can be kept small. The charge that is stored within the battery pack is therefore used more efficiently. The operating time of the battery pack-operated power tool is thus increased.

Advantageously, the operating element is pivotable about an axis of rotation wherein the travel range of the operating element within which no energy is supplied extends about an angle of 0° to 10°, in particular up to approximately 7°. Only after having passed through this first travel range as a "dead" travel, i.e., when passing from the first "dead" travel range into the subsequent second travel range the motor is adjusted by a jump to a predetermined electric power value that is expediently approximately 30% of the nominal voltage of the motor. Advantageously, the control signal of the motor is supplied expediently as a pulse-width modulated signal. In order to keep losses small, the control signal is a direct current signal wherein the electric drive motor is embodied as an EC motor (electronically commutated motor).

According to another aspect of the invention, in the power circuit of the electronic control unit at least one mechanical switch is arranged that switches on and off the power circuit. Such a switch is expediently a component of a two-hand safety device in order to improve the operational safety of an battery pack-operated hand-held power tool.

The electronic control unit and the switching position of the switch are matched to one another in such a way that the switch opens and closes in a current-less state. This means that the power circuit at the moment of switching of the switch is currentless and the switch, in normal operation, is opened only once the current in the power circuit is zero. In this way, for a two-hand safety device it is possible to employ simple switches whose contacts are protected against overload and the entailed consequences such as contact erosion.

DESCRIPTION OF THE PREFERRED EMBODIMENTS

Figure 1:
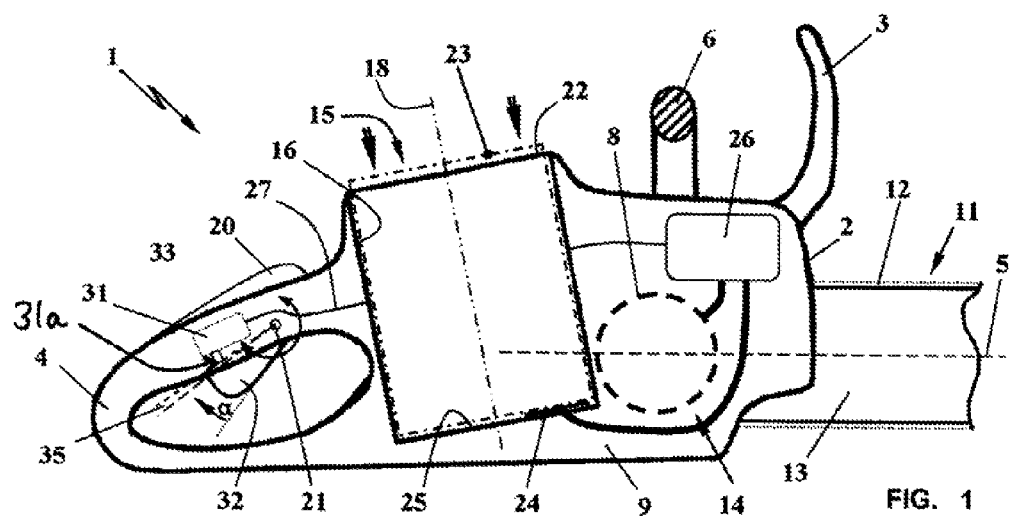
FIG. 1 shows in a schematic side view a hand-held power tool embodied as a motor chain saw.
Figure 6:
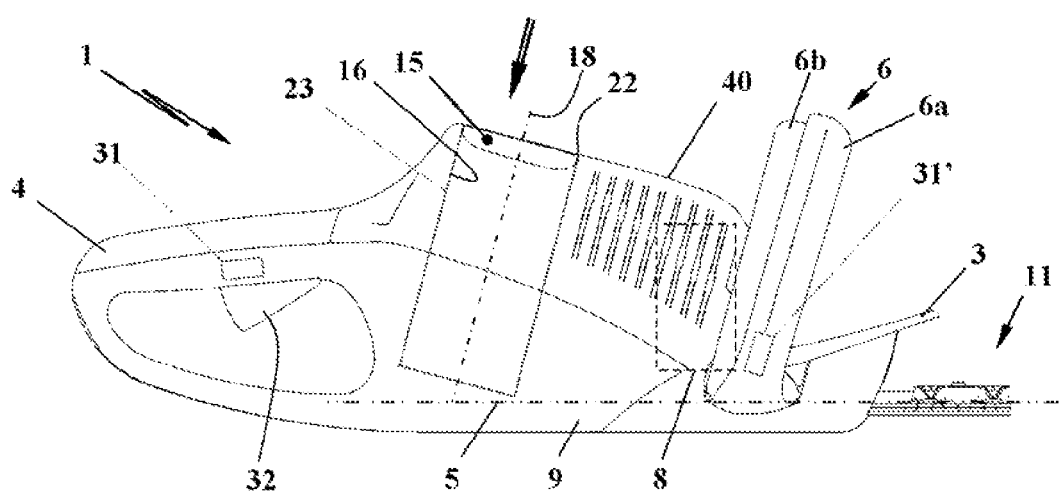
FIG. 6 is schematic side view of a hedge trimmer.

The example of a hand-held power tool 1 illustrated in the drawings is embodied in FIG. 1 as a motor chainsaw 2 and in FIG. 6 as a hedge trimmer 40. The illustrated embodiments are representative also for other embodiments of power tools such as a cut-off machine, a brush or grass trimmer, an edger, a pole pruner, a blower, a sprayer, a vacuuming device, an earth auger, a multi-task power tool for multi-functional attachments, a sweeper, a rotary hoe, a rototiller, a high-pressure cleaning device, a lawnmower, a dethatcher, a chopper or shredder, a wet/dry vacuum cleaner or similar, in particular hand-held, power tools.

An operator guides the power tool 1 by means of two grips 4 and 6, wherein a first rear grip 4 is gripped by one hand of the operator and the second front grip 6 is gripped by the other hand of the operator. The illustrated hand-held portable power tools 1 are so-called "two-hand devices" that must be gripped with both hands by the operator in order to be able to hold and guide the power tool 1.

The rear grip 4 of the power tool 1 (FIGS. 1 and 6) is preferably embodied as a monolithic part of the device housing 9 and is comprised in particular of joined grip shells. The front grip 6 is embodied as a bow grip that is substantially positioned transversely to a longitudinal axis 5 of the power tool. The rear grip 4 is aligned in the direction of the longitudinal axis 5. In front of the front grip 6 a hand guard 3 is arranged that, in case of a motor chain saw 2 (FIG. 1), is expediently embodied as a mechanical actuator for a safety brake with which the working tool 11 can be braked and stopped within fractions of a second.

In case of a hedge trimmer according to FIG. 6, the front bow grip 6 is expediently of a two-part configuration wherein the parts 6a, 6b are movable relative to one another in order to actuate a switch 31' of an electric two-hand safety device that is arranged between them. The switch 31' may be actuated directly by the parts of the bow grip or indirectly by means of transmission elements such as a switching bracket or the like.

In the device housing 9 of the power tool 1 an electric drive motor 8 as well as an output 14, in case of a motor chain saw, a chain pinion, for the working tool 11 is received. In the embodiment according to FIG. 1, the working tool 11 is a saw chain 12 that circulates in an outer circumferential groove of a guide bar 13. In the embodiment according to FIG. 6, the working tool 11 is a cutter bar with reciprocating cutter blades.

The electric drive motor 8 has an electric power rating of more than 150 watts, preferably an electric power rating in the range of 500 to 5.000 watts. The motor can be expediently embodied as a brush motor; preferably, the motor is however a high-performance motor, particularly an EC motor (electronically communicated motor) or brushless motor.

In the device housing 9 of the power tool 1a compartment 16 for a battery pack 15 is provided wherein the compartment 16 substantially matches the volume or size of the battery pack 15 so that the battery pack 15, as illustrated in dashed lines in FIGS. 1 and 6, is substantially completely received in the compartment 16 of the device housing 9.

The battery pack 15 is comprised of a battery pack housing 23 in which a plurality of battery cells is arranged. The battery cells are either rechargeable battery cells, for example, a NiCd cell (nickel cadmium cell), a NiMH cell (nickel metal hydride cell), an Li-ion cell (lithium ion cell), a LiPo cell (lithium polymer cell), a LiFePO4 cell (lithium iron phosphate cell), a lithium titanate cell or a cell of a similar configuration. Expediently, the cell voltage of an individual cell is in the range of 2 volts to 5 volts, preferably 3.6 volts to 3.7 volts. With such battery cells, depending on the embodiment of the circuit (serial connection, parallel connection) battery pack voltages of 12 volts to 150 volts, preferably, 20 volts to 51 volts, can be provided. In the illustrated embodiment, an off-load voltage of the battery pack 15 of 20 to 42 volts is provided, depending on the charge state.

Figure 2:
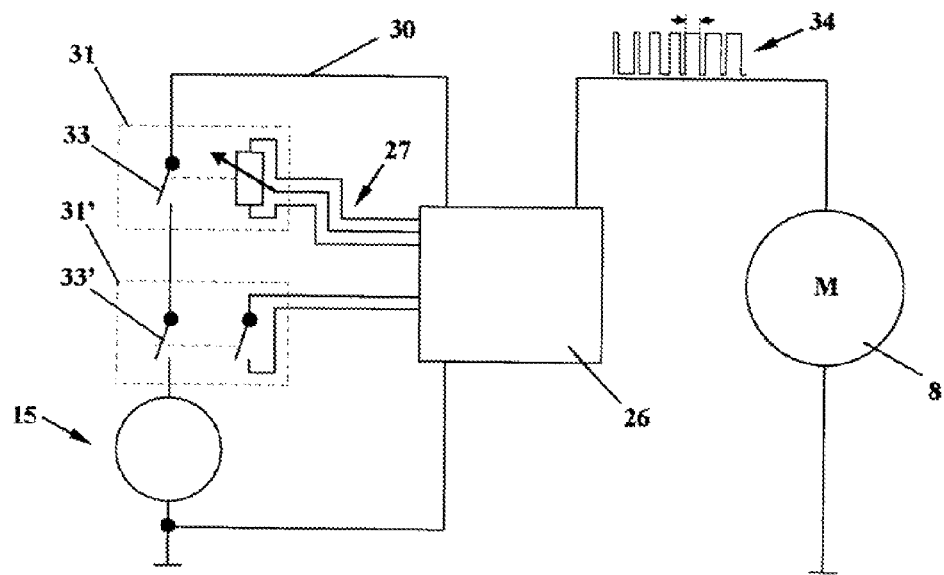
FIG. 2 is a schematic illustration of a power circuit with electronic control unit for a brush motor.
Figure 3:
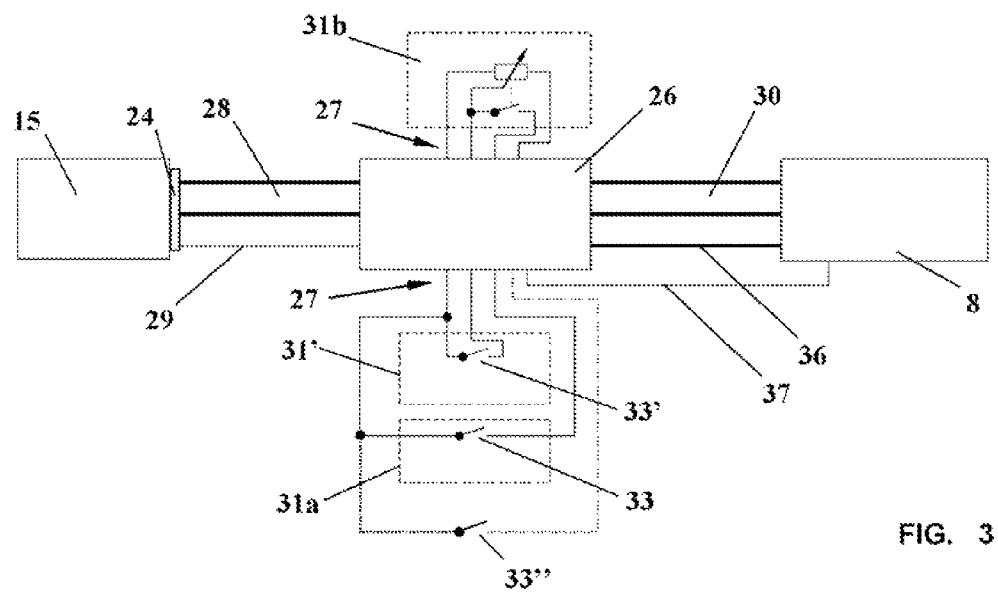
FIG. 3 is a schematic illustration of an electronic control unit for a brushless electric motor.

The battery cell block comprised of individual battery cells and electrically connected within the battery pack housing 23 is electrically contacted by an external contact plate 24 wherein the contact plate 24 is provided on the bottom 25 of the compartment 16. The contact plate 24 is thus positioned remote from the insertion opening 22 of the compartment 16 so that upon insertion of the battery pack 15 in the direction of its longitudinal axis 18 electric contacting of the battery pack 15 in the end section of the insertion path is realized. The contact plate 24 is connected to an electronic control unit 26 to which is connected the electric drive motor 8 by means of a power circuit 30 (FIGS. 2, 3). The electronic control unit 26 converts the control signals received through control line 27 from an electric switching and actuating member 31 or 31a, 31b (FIG. 3) that is embodied also as a position sensor, and controls the drive motor 8 in accordance with the travel position of the operating element 32 embodied as a throttle lever. In this connection, the electronic control unit 26 supplies direct current from the battery pack 15 in the form of a pulse-width modulated signal sequence 34 (FIG. 4) to the drive motor 8 wherein the signal strength has a voltage $V_1$ that is smaller than the voltage of the battery pack. The battery pack voltage, depending on the charge state, is expediently 20 volts to 42 volts.

The period duration τ of the pulse-width modulated signal sequence 34 is composed of the signal S itself with a signal duration $T_S$ and a signal pause P with a pause duration $T_P$. The signal duration $T_S$ is varied for a period duration τ that remains the same as a function of the required power from 0% to M %. At 0% the signal duration $T_S$ is equal to zero. At M % the signal duration $T_S$ corresponds to an average predetermined motor voltage of, for example, 26 volts. For the period duration τ the following holds true: $T_S+T_P=\tau$.

In FIG. 2, the circuit diagram of an electric motor 8 embodied as a brush motor is illustrated whose power circuit 30 can be interrupted by switches 33 and 33'. The switches 33, 33' are positioned immediately within the power circuit 30 so that with open switches 33 or 33' the motor 8 remains currentless even when the operating element 32 embodied as a pivotable throttle lever is suppressed by itself, for example. In the illustrated embodiment, a throttle lock 20 is correlated with the throttle lever 32 and is arranged on the side of the grip 4 facing away from the throttle lever 32. The throttle lever 32 and the throttle lock 20 are interacting with one another in such a way that the throttle lever 32 can be actuated only when the throttle lock 20 is suppressed.

The switch 33' is part of a switching member 31' and can be correlated with the front grip 6, as illustrated in the embodiment of a hedge trimmer 40 according to FIG. 6 in a schematic illustration. The drive motor 8 can be operated only, and only, when the operator with one hand grips the rear grip 4 and with the other hand the front grip 6. Only after gripping the grips 4, 6 the switches 33 and 33' are closed wherein at the same time the mechanical lock between the throttle lock 20 and the throttle lever is released so that the operator can now suppress the operating element (throttle lever) 32 embodied as a throttle lever.

Figure 4:
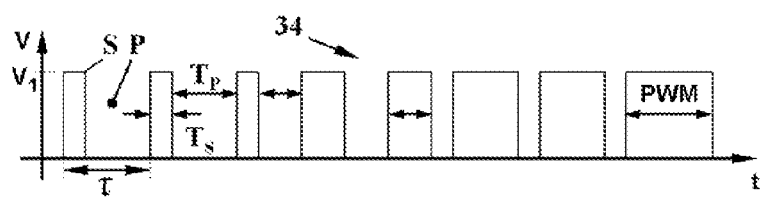
FIG. 4 is pulse width-modulated signal sequence.

Once the operator has gripped both grips 4 and 6 and in this way has closed the switches 33 and 33', the throttle lock 20 is released so that the throttle lever can be actuated by the operator. The throttle lever 32, as shown in FIG. 1, is pivoted by an angle α in the direction of the arrow about the axis of rotation 21 and, as a result of this, the actuator 31 embodied as a position sensor will send a signal that depends on the travel position or pivot position of the throttle lever 32 and the resulting actuating position of the actuating pin 31a by means of the control line 27 to the electronic control unit 26. The electronic control unit 26 controls the electric drive motor 8 as a function of the travel position of the operating element 32 and the accordingly acted-on actuator 31. The control of the brush motor 8 is realized by means of the electronic control unit 26 by means of the direct current (DC) supplied by the battery pack 15; as shown in FIG. 4, the direct current is supplied as a pulse width-modulated signal 34. By means of this circuit it is achieved that the switches 33 and 33' in the power circuit 30 in normal operating situation are always closed in the currentless state so that the contact load is minimal and contact erosion is avoided in this way.

In order to reduce the start-up losses of the drive motor 8, it is provided that within a first travel range 35 (FIG. 1), the pulse width of the signal S is adjusted to 0% so that the electric energy supplied in the first travel range 35 immediately following the inoperative position (rest position) supplied to the electric motor is "zero". The actuator 31 that is acted on by the operating element 32 is expediently designed such that the first "dead" travel range 35 corresponds to approximately 30% to 60% of the total travel of the actuator 31 (e.g. its actuating pin 31a), in particular approximately 40% to 45% of the total travel.

Figure 5:
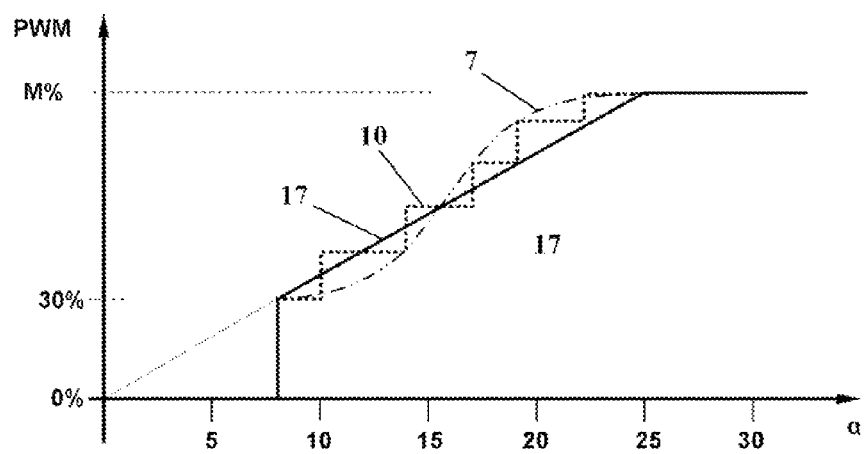
FIG. 5 is a diagram of pulse width plotted against the pivot angle of the operating element.

Expediently, the first travel range 35 within which no energy is supplied to the drive motor 8 and the pulse width $T_S$ of the signal S is zero, corresponds to a rotary angle of the operating element 32 embodied as a throttle lever of 0° to 10°, in particular up to 7°. As shown in FIG. 5, at the end of the "dead" travel range 35, the pulse width PWM is increased suddenly to a predetermined start value, for example, 30% of the nominal power of the motor or the nominal voltage of the motor so that the electric motor 8 will start powerfully and the loss-rich start-up phase is as short as possible.

Across the further travel range of the throttle lever 32 about a rotary angle range of the throttle lever of up to, for example, 25° to 30°, an increase of the pulse width occurs until at the end the travel range a pulse width of M % is reached that may be smaller than 100%. The pulse width of the predetermined M % corresponds to a desired maximum motor voltage of the electric motor 8, for example, a maximum supply voltage of, for example, 26 volts. In wide operating ranges the battery pack voltage will therefore always be greater than the voltage supplied to the motor. When the battery pack voltage drops as a result of decreasing charge level below a threshold value of, for example, 28 volts, the pulse width PWM is lowered in a controlled fashion so that the operator will experience a reaction of the electric device as a result of the lower battery pack charge so that the operator is able to take measures to continue working, for example, charging the battery pack or inserting a replacement battery pack:

When the drive motor 8 is an EC motor or brushless motor, the control is realized by means of a circuit according to FIG. 3. In the power circuit of the electric motor 8 no mechanical switches are arranged. The control of the current supply is realized preferably by electronic components such as a MOSFET (metal oxide semiconductor field effect transistor) or a similar power component. The battery pack 15 is electrically connected directly to the electronic control unit 26 through connector 28 at the contact plate 24, wherein the electronic control unit 26 by means of electronic power components and the power circuit 30 directly supplies the electric motor 8 with power. By means of control line 36 the EC motor is controlled so that the required control electronics for operating the EC motor may be integrated in the electronic control unit 26 of the power tool 1. Sensor lines 37 provide the electronic control unit 26 with feedback in regard to the field state of the brushless motor 8. By means of control line 29 the electronic control unit 26 is furthermore supplied with operating data of the battery pack 15 in order to take these data into account for the control action.

The switches 33 and 33' of the actuators 31, 31' are arranged in the control circuit and by means of control lines 27 connected to the electronic control unit 26. Depending on the switching state of the switches 33 and 33' or the actuator 31b the motor 8 is controlled. In this connection, a power control in the power circuit is done by pulse width modulation in the same way as disclosed in connection with the brush motor and as illustrated in FIGS. 4 and 5.

As illustrated in dotted lines, by means of the control lines 27 further switching elements 33" may be connected, for example, in order to send a status signal of a further component required for operating the power tool to the electronic control unit 26.

The pulse width PWM increase up to M % or to the predetermined motor voltage of, for example, 26 volts, can be done in accordance with a curve that is designed expediently. In a first embodiment, as illustrated in FIG. 5 by a solid line, the increase can be linear and continuous from 30% to M % according to the straight line 17. The operator thus has available a throttle lever 32 with which he can finely control the power as needed.

It can also be expedient to provide increase of the pulse width up to M % according to curve 7, as indicated e.g. in dash-dotted line in FIG. 5. Also, a stepped increase according to the stepped curve 10 can be advantageous as illustrated in dotted line in FIG. 5.

The value M is dependent on the actual voltage and thus on the charge state of the connected battery pack 15. When the battery pack 15 is completely charged, a battery pack voltage of, for example, approximately 42 volts is present so that the pulse width is controlled to a value of approximately 60%. When the battery pack is already discharged to a large extent and has, for example only a battery pack voltage of only 30 volts, the pulse width is increased to 85% so that the motor 8 is still supplied with a nominal voltage of, for example, 26 volts. When the actual battery pack voltage drops below a threshold value of, for example, 30 volts, the pulse width can be reduced in a targeted fashions so that the operator can detect a reaction to the dropping battery pack voltage.

The power tool 1 illustrated in FIG. 6 shows a hedge trimmer 40 with a cutter bar as a working tool 11. The basic construction of the hedge trimmer 40 corresponds to that of the power tool 1 according to FIG. 1 so that same parts are used for same reference numerals.

The specification incorporates by reference the entire disclosure of German priority document 10 2009 012 181.1 having a filing date of Feb. 27, 2009.

While specific embodiments of the invention have been shown and described in detail to illustrate the inventive principles, it will be understood that the invention may be embodied otherwise without departing from such principles.

What is claimed is:

1. A hand-held power tool comprising:
a device housing;
at least one grip disposed on said device housing;
an electric drive motor arranged in said device housing;
an output connected to said electric motor for operating a working tool;
a battery pack providing direct current as electric energy for operating said electric drive motor an electronic control unit that is connected through a power circuit to said electric drive motor and is further connected to said battery pack;
an operating element disposed on said at least one grip for controlling said electric drive motor;
an electric actuator acted upon by said operating element, wherein said electric actuator generates an output signal that is dependent on a position of said electric actuator, the position of said electric actuator dependent on a position of said operating element, wherein the output signal is supplied through a control line to said electronic control unit;

wherein said electronic control unit supplies to said electric drive motor the direct current of said battery pack as a pulse width-modulated signal sequence based on the position of said electric actuator;

wherein a period duration of the pulse-width modulated signal sequence is composed of a voltage signal with a signal duration and of a signal pause with a pause duration, wherein, with the period duration remaining the same, the signal duration is varied by said electronic control unit as a function of the position of said electric actuator so that the electric energy that is applied to said electric drive motor by said electronic control unit is applied as a function of the position of said operating element, wherein in a first dead travel range of said operating element that adjoins an inoperative position of said operating element the supplied electric energy is zero;

wherein upon passing from said first dead travel range to an adjoining second travel range, the pulse width of the signal sequence jumps from zero to a predetermined start value.

2. The power tool according to claim 1, wherein said first dead travel range of said operating element is approximately 30% to 60% of a total travel range.

3. The power tool according to claim 2, wherein said first dead travel range of said operating element is approximately 40% to 45% of said total travel range.

4. The power tool according to claim 1, wherein said operating element is pivotable about an axis of rotation and wherein said first dead travel range corresponds to a rotary angle of 0 to 10°.

5. The power tool according to claim 4, wherein said first dead travel range corresponds to a rotary angle of up to 7°.

6. The power tool according to claim 1, wherein the predetermined electric energy value is approximately 30% of a nominal power of said electric drive motor.

7. The power tool according to claim 1, wherein said electric drive motor is an electronically commutated motor.

8. The power tool according to claim 7, wherein control electronics of said electronically commutated motor are integrated into said electronic control unit.

9. The power tool according to claim 1, comprising a switch arranged on said at least one grip, wherein said switch is a component of a two-hand safety device.

10. The power tool according to claim 1, wherein said power circuit that supplies operating power comprises at least one mechanical switch.

11. The power tool according to claim 10, wherein said electronic control unit and a switching position of said at least one mechanical switch are matched to one another such that said at least one mechanical switch opens and/or closes when currentless.

* * * * *